Feb. 10, 1959 J. D. NOBLE 2,873,036
PORTABLE BATCHING PLANT
Filed Dec. 16, 1954 3 Sheets-Sheet 1
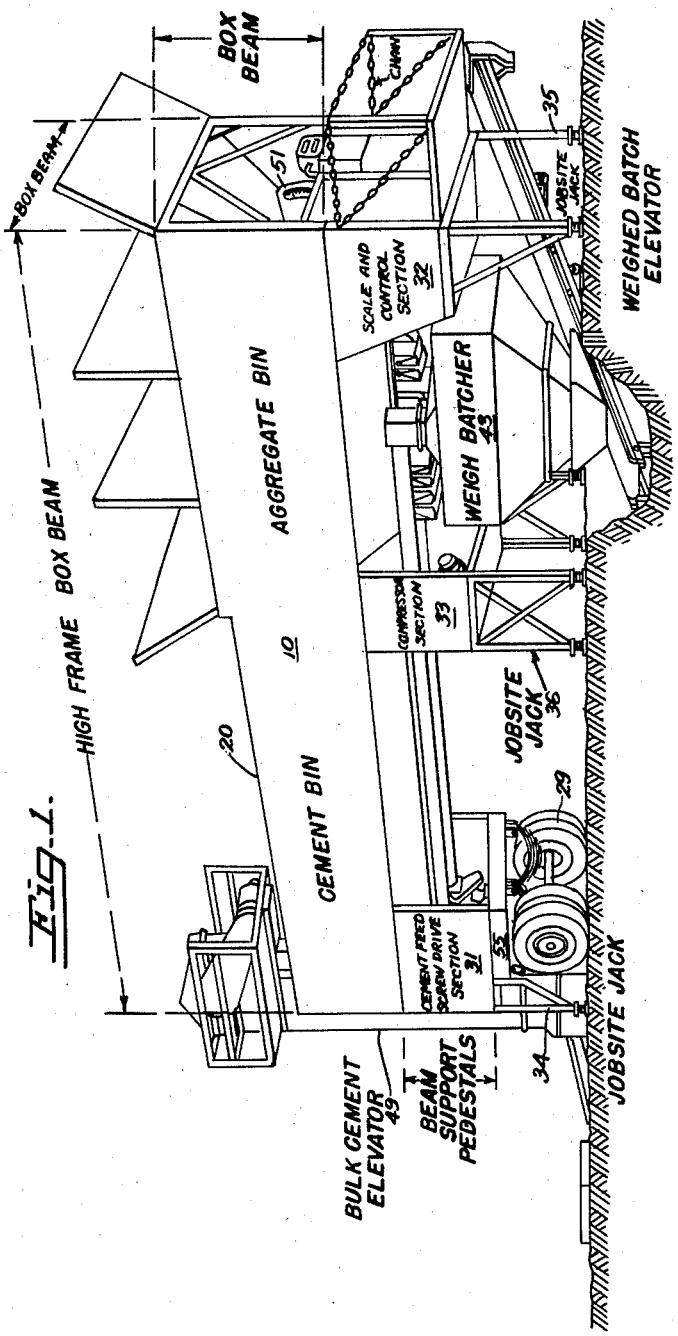
INVENTOR.
JACK D. NOBLE
BY
ATTORNEY

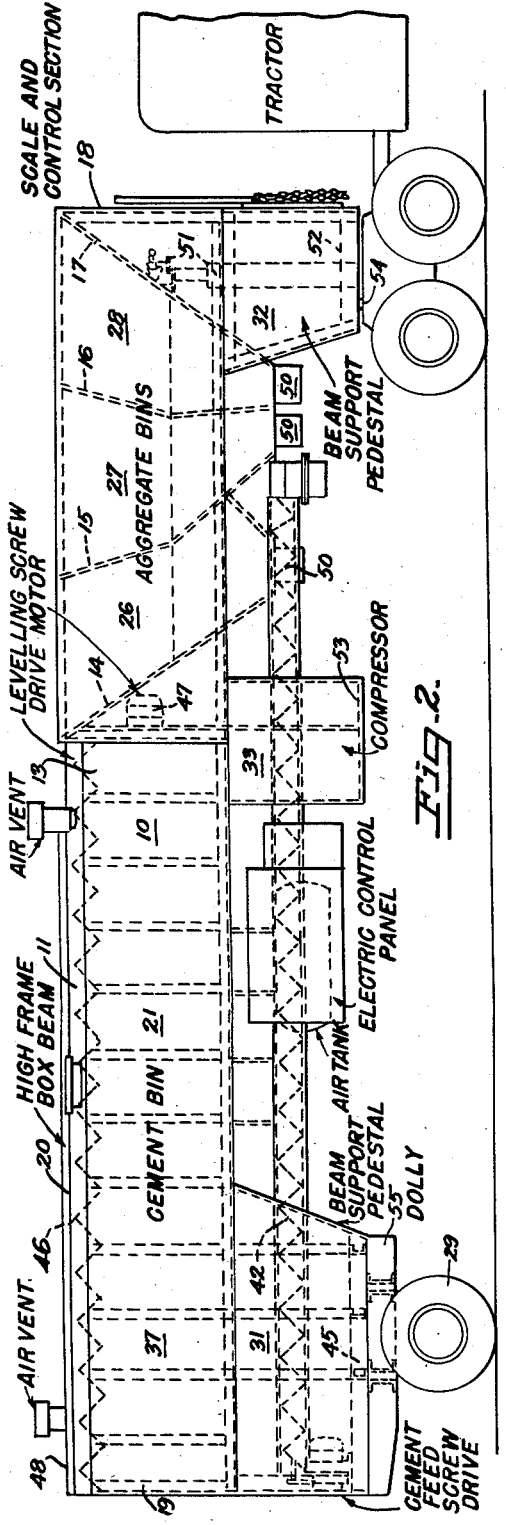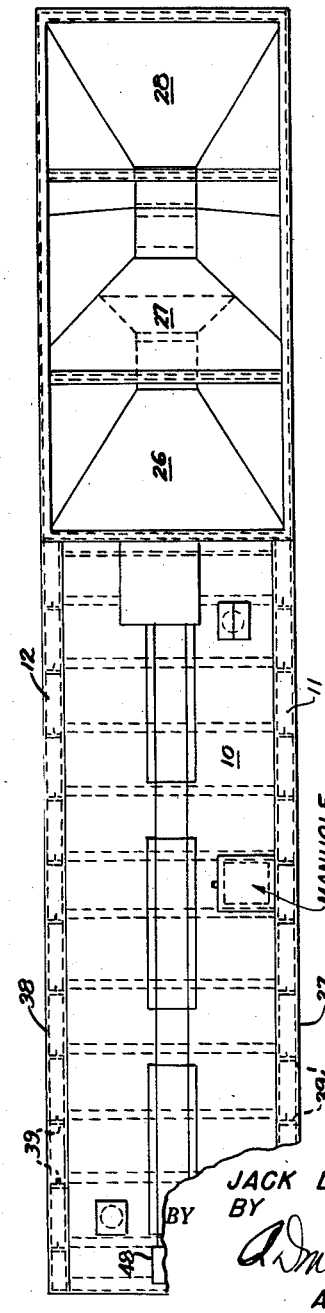

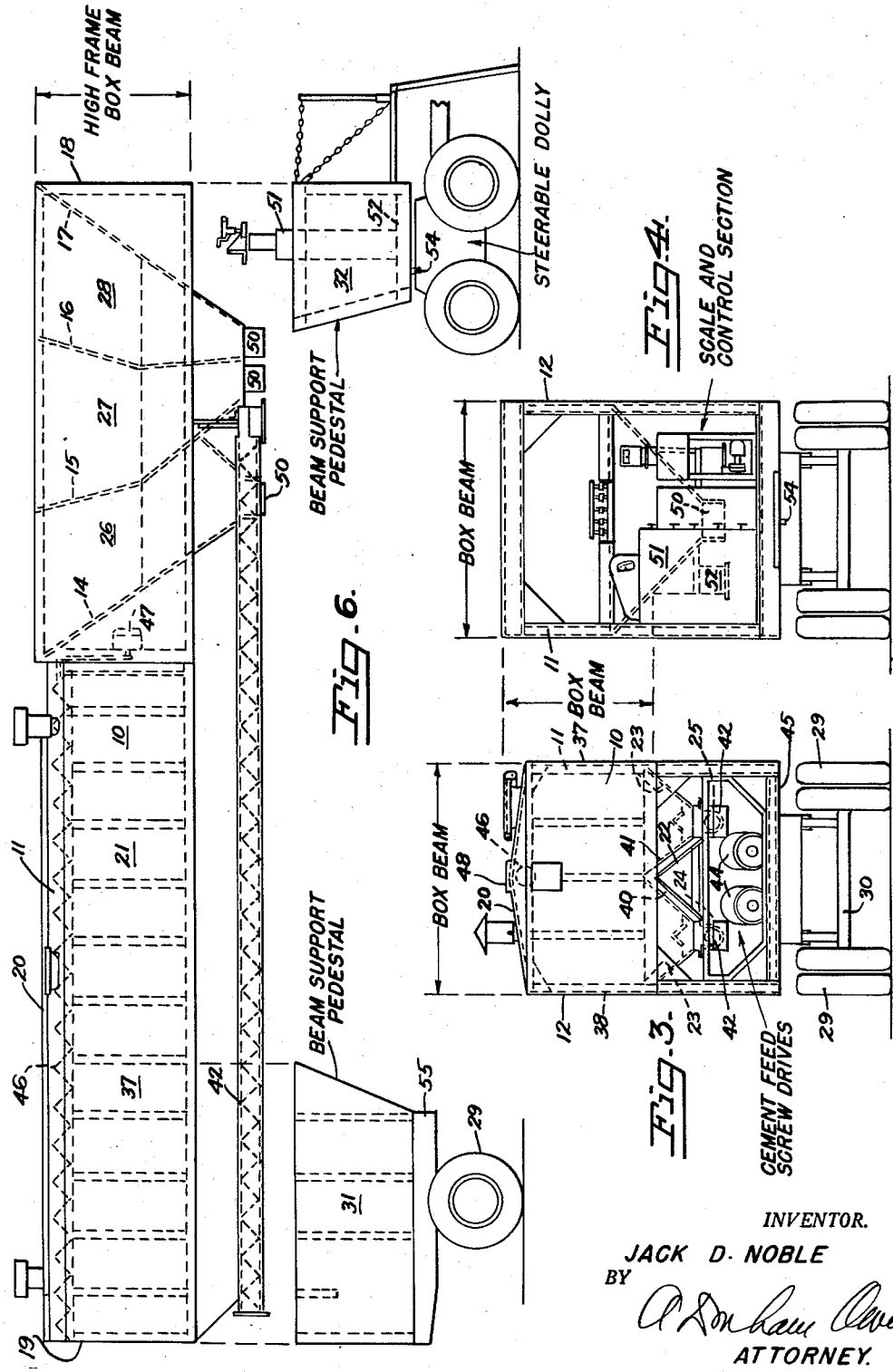

United States Patent Office 2,873,036
Patented Feb. 10, 1959

2,873,036

PORTABLE BATCHING PLANT

Jack D. Noble, Lafayette, Calif.

Application December 16, 1954, Serial No. 475,738

9 Claims. (Cl. 214—2)

This invention relates to improvements in large capacity portable batching plants adapted for movement over existing highways in substantially assembled condition.

Prior portable batching plants have either required major disassembly when being moved or, if left assembled, have had to be so small in capacity as to make their use impractical.

An object of the present invention therefore, is the construction of a unitary portable batching plant having large capacity and yet being of an over-all size and weight not exceeding the legal limits for travel on various state highways. This object is attained by novel features of construction and design such as the high frame comprising a strong back or bridge-like structure adapted to carry the load as well as to comprise the bins and to make all bin gate parts easily accessible from below for servicing. Contributing to this new result is the pedestal mounting of the fifth wheel and the dolly, and the other features to be described herein.

Another object is the provision of a self-contained, unitary portable batching plant having integral depending mounting means adapted to support the horizontally extending frame with the cement silo and the bins high above the ground and not requiring a specially poured foundation when the plant is in use, and leaving clear open spaces beneath the high frame to receive the weigh hopper, the weighed batch conveyor, the auxiliary equipment, and to permit easy access to these and other parts when servicing is needed.

Another object of the invention is to provide a unitary complete batching plant, having a substantially horizontal fore and aft floor line above which the cement silo and the aggregate bins extend and below which the operating machinery is suspended, thereby producing a novel, economical, rugged, quickly assembled plant.

Another object of the horizontally extending box beam arrangement is to make it possible to have the beam with its bins made up on the floor of the factory where it is convenient and accessible to workers and to have the pedestal sub-assemblies made up in the plant without too close attention to tolerances in their brackets, so that when the box beam is raised and the pedestals are brought under it to effect the assembly of the whole, the pedestals may be adjusted along the bottom of the box beam into good working position and then secured in place.

Another object of the invention is to provide a portable unitary batching plant in which the sides of the cement silo and of the aggregate bins serve also as the main load carrying frame for the whole plant, and thereby eliminate the need for a trailer frame or other chassis extending the full length of the plant.

Another object of the invention is to provide a portable, complete batching plant capable of having the elevators and the weigh hopper assembled alongside it at the jobsite in a portion of a day.

Another object of the invention is to provide a portable batching plant using bulk cement and with the bins low enough to permit skip loading, thereby reducing to a minimum the number of men required to run the plant.

Another object of the invention is to provide a portable batching plant large in capacity but so trim in appearance and low in over-all height as not usually to require a zoning permit where put in use.

Another object of the invention is to provide a portable plant with the cement silo and the aggregate bins in working position along a horizontal fore and aft line and therefore not requiring a crane at the time of erection or when preparing the plant for travel on the road.

Another object of the invention is to provide a practical portable batching plant capable of using bulk cement with the consequent economy in price paid for the cement and in eliminating a man to open sacked cement into a hopper.

Other objects and advantages of the invention will become apparent in the course of the following detailed description taken in connection with the accompanying drawing, wherein:

Fig. 1 is a view in perspective showing the device of my invention installed at a jobsite on its jobsite jacks with the cement elevator, the weigh hopper, and the weighed batch conveyor set in operative position;

Fig. 2 is a view in side elevation showing the device of my invention as it appears when on the road with only the rear of the hauling tractor shown;

Fig. 3 is a view in end elevation of the rear end of the device;

Fig. 4 is a like view of the front end of the device;

Fig. 5 is a plan view of the device of Fig. 2; and

Fig. 6 is a diagrammatic exploded view of the three basic elements of the device, the box beam batcher frame and the front and rear pendant support sub-assemblies.

While the device is shown and described as applied to weighing up batches of aggregates for making concrete, the basic features of the invention apply as well to a hot mix batching plant, a soil treatment batching plant, or any other plant requiring accurate batching of different ingredients.

The present invention has solved a long-standing problem in the portable batching machine art in cutting down weight, in giving large capacity in a plant that is within the legal width and length limits of most state road laws, in economy of materials and labor during manufacture, and in providing a plant which is full size and therefore can, with no changes in the basic plant, be arranged for use on a permanent base. Should the customer subsequently wish to use it as a portable plant, it can be readily reassembled and used as a trailer. This versatility comes about from the novel box beam frame incorporating the several bins in a row to provide a horizontally extending plant adapted to be supported near its ends on the pendant support columns.

Another way of describing the invention is to term it a batching package, complete within itself both structurally and mechanically. Thus it lends itself, in the customer's hands to use as a trailer type portable plant as described and illustrated, or if the customer chooses, in meeting special job conditions the batch package can shed its trailer adjuncts and be mounted on permanent or semi-permanent piers. As noted, this is possible because of the novel box beam construction by which the strength needed is built into the package in the first instance, making it supportable on its mounting pads. The box beam is like a strongback giving the batching package great flexibility for incorporation in batching plants of many different designs.

Referring now to the drawings, the batching package comprises a single continuous beam 10 running fore and aft, which beam in a sense is a box girder composed of the longitudinally extending side girders 11 and 12 with the cross partitions 13, 14, 15, 16, 17 and the end plates 18 and 19. The top 20 over the silo section 21 adds rigidity to the beam 10, as does the bottom made up of the center triangular beam member 22, and the inwardly sloping side walls 23, which are tied to the beam member 22 by the feed screw housings 24 and 25.

This single continuous box beam 10 functions as the cement silo 21, and as the aggregate bins 26, 27, 28, and also functions as the sole supporting frame or strongback for the batching plant, thereby eliminating weight of steel and time of labor in manufacture of the batching package. This saving of weight not only effects an economy in steel, but also lightens the batching package that must travel on the roads, thereby making possible the use of a minimum number and size of tires 29 and axles 30 while still complying with the legal requirements for travel. When prepared for travel, the silo and the bins 26, 27 and 28 are empty.

The strength of this single continuous beam 10, which houses and comprises the basic batching package is such that when set up at a jobsite (see Fig. 1) it requires support only at its ends and at one midpoint to sustain the fully loaded silo and bins. As shown in Fig. 2 my invention of the basic batching package makes it possible to mount on the pads in the supporting columns 31, 32, and 33 all the auxiliary equipment needed to operate the silo, the bins and the batcher. The jobsite jacks 34, 35 and 36 on which they rest are carried on the pad in the column 31 when on the road.

The silo section

The silo section 21 is the open interior of the box beam 10 and has the vertical plate walls 37 and 38 stiffened with spaced steel shaped stiffeners 39. The bottom is formed of inwardly sloping plate walls 23 which are matched by walls 40 and 41 of the triangular fore and aft beam stiffener 22. At the bottom of each pair of walls 23 and 40 and 23 and 41 is provided a screw housing 24 and 25 respectively which strengthens the box beam 10 and completes the bottom wall of the silo 21. In each screw housing 24, 25 a screw 42 is mounted, which when rotated moves the cement or other material forward to the weigh batcher 43. The feed screws 42 are preferably each driven by separate motor units 44 mounted on the pad 45 of the rear support 31. The top of the silo 21 is covered by a plate 20 and directly beneath it in the center is located a levelling screw 46 which distributes the cement or other material throughout the silo. This screw is driven by the motor 47 located adjacent its forward end. The cement is lifted into the silo inlet opening 48 by any suitable elevator mechanism 49.

The bin section

The bin section is a continuation of the same side beam 11 as comprises the silo section 21 and is divided by partitions 15 and 16 which, with the sloping end partitions 14 and 17, form three bins 26, 27 and 28. There may be more or fewer bins depending upon the job to be done, for example where the device is to be used by an oil well cementing company the bin section may be eliminated and the silo section 21 extended to fill substantially the whole batching package 10.

Each bin has a suitable gate 50, shown only diagrammatically in the drawings as they are well known in the art.

Below the bin section is mounted a suitable weigh hopper 43 and scale mechanism 51, both of which are well known in the art. The scale mechanism is mounted on the pad 52 in the supporting section 32 which section sustains the batching package both when in use at the jobsite or when on the road. In certain installations of the batching package the section 32 may be omitted and the scale 51 may be mounted on some other support. The center support column 33 depends from the batch package 10 when the unit is on the road, at which time the silo and bins are empty, and forms a support when the unit is in use at the jobsite and the silo and bins are full. On the pad 53 on the support 33 is mounted a suitable compressor to provide the fluid pressure needed to operate the various gates and controls on the device.

While I have shown a fifth wheel king pin 54 at the forward end of the batching package, it may be desirable under some conditions to use there instead a steerable trailer dolly as shown in Fig. 6. At the rear of the unit I show a fixed dolly 55 engaging the under side of the pad 45 of the support 31. The jobsite jacks 34, 35 and 36 (see Fig. 1) are removable and when on the road are carried on the back pad 45.

Utilizing the strength of the bin and cement silo walls not only for their confining function, but also utilizing this strength to form the trailer frame, thereby lightening the whole to the point that a single axle dolly can be used on the highway, is one of the numerous novel features of the invention.

Summarized, some of the advantages of the box beam batching package unit described are these:

(1) The sides carry the whole load so the bottom of the batcher is open and accessible for servicing as is apparent by a study of Fig. 1.

(2) Since the sides carry the whole load and also form the bins and silo walls, there is no heavy frame or chassis needed, so the batching package is kept large in capacity and yet within highway travel weight and bulk limits.

(3) The box beam mounted on the pedestal supports gives the batching package good clearance for movement over rough terrain at the jobsite and yet the box beam idea enables the over-all height to be kept down because there is no need for a separate chassis.

(4) The box beam batching package can be made up complete on the floor of the plant where it is easily accessible to workmen and can then be lifted to its normal height above the floor when the pedestal supports are brought in for assembly.

(5) The box beam is the complete strength member, independent of the pedestals or any outside fore and aft frame members.

Summarized, some of the advantages of the support pedestals are these:

(6) These pedestals with their pads, place the accessories carried on them in easily reached position for repair, servicing and replacement.

(7) These pedestals support the batcher clear of any obstruction so the cement screws, the bin gates and other vital parts are easily reached if they need attention of any sort.

(8) These pedestals can be made up complete as subassemblies, and permit the same as to the batcher as noted in 4 above, and effect great economies in manufacturing costs.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A portable batching plant having gated bins for granular components and adapted for highway transport in substantially an assembled ready-to-run condition, said plant being characterized by a unitary horizontally disposed hollow main box beam which in cross-section is generally rectangular in shape with vertical side valves and inwardly sloping bottom walls, said beam extending the full length of the plant and constituting the main frame thereof, with the vertical and the inwardly sloping side walls of said beam forming both the principal strength members and the sides of said bins; a plurality of spaced apart supporting pedestals each having vertical side walls comprising their strength members and a level mounting pad bridging the space between said last-named strength members, said supporting pedestals being secured one below each end of said horizontally disposed main box beam, whereby the latter is supported for transport or for jobsite use; and ground-engaging means beneath each said pedestal for supporting said plant.

2. The device of claim 1 in which the auxiliary operating mechanisms are mounted on the pads directly below the bottom of the main box beam.

3. A portable batching plant capable of highway transport in substantially an assembled ready-to-run condition, including in combination: a unitary horizontally disposed hollow main box beam generally rectangular in cross-sectional shape, having vertical side walls and inwardly sloping bottom walls, said beam extending the full length of the plant and constituting the main frame thereof, said vertical and inwardly sloping side walls forming both the principal strength members and the sides of bins for granular components, said bins having gates therein; a plurality of spaced-apart supporting pedestals, each pedestal having vertical side walls comprising their strength members and a level mounting pad bridging the space between them, one said supporting pedestal being secured below each end of said main box beam and supporting it for both transport and jobsite use; and ground-engaging support means beneath each said pedestal.

4. The plant of claim 3 in which auxiliary operating mechanisms for said plant are mounted on the pads directly below the bottom of the main box beam.

5. A portable batching plant adapted for highway transport, comprising a unitary horizontally disposed hollow main box beam which in cross-section is generally rectangular in shape, having vertical side walls and inwardly sloping bottom walls, said beam extending substantially the full length of the plant and constituting the main frame thereof with the vertical and the inwardly sloping side walls of said beam forming the principal strength members; a plurality of gated bins for granular components, the sides thereof comprising said vertical and inwardly sloping side walls; and a plurality of spaced-apart supporting pedestals each having vertical side walls comprising their strength members bridged by a level mounting pad, said supporting pedestals being secured one below each end of said horizontally disposed main box beam and each having ground-engaging means therebeneath for supporting said plant.

6. A portable wheel-mounted aggregate batcher having a high main body portion extending generally fore and aft and composed of a unitary horizontally disposed hollow main box beam generally rectangular in cross-sectional shape, having vertical side walls and inwardly sloping bottom walls, said beam extending the full length of the batcher and constituting the main frame thereof, said vertical and inwardly sloping side walls forming both the principal strength members and the sides of bins for granular components, said bins having gates therein; said body portion being divided by vertical lateral walls into a plurality of said bins, one of which comprises a horizontally extending fine aggregate silo, with feed screw means extending the full horizontal length thereof, others of which comprise vertically extending coarser aggregate bins; a weigh hopper under said aggregate bins and under the outlet of said feed screw; and pedestal support members depending at the ends of said box beam, adapted to be secured to wheel-mounted units for movement on the roads, or to jacks when in place at the jobsite.

7. A portable batching plant comprising a plurality of bins arranged in line along the fore-and-aft axis of said plant, the sides and bottom of said bins being joined together as an integral unit and forming the walls and bottom of a unitary horizontally disposed hollow main box beam generally rectangular in cross-sectional shape, having vertical side walls and inwardly sloping bottom walls, said beam extending the full length of the plant and constituting the main frame thereof, said vertical and inwardly sloping side walls forming the principal strength members as well as the sides and bottoms of said bins, said bins having gates therein; pedestal members secured under end portions of said box beam for support thereof; means to dump material selectively from any or all of said bins; and ground-engaging members supporting said pedestal members.

8. A portable batching plant comprising a unitary horizontally disposed hollow main box beam generally rectangular in cross-sectional shape, having vertical side walls and inwardly sloping bottom walls, said beam extending the full length of the plant and constituting the main frame thereof, said vertical and inwardly sloping side walls forming both the principal strength members and the sides of bins for granular components, said bins having gates therein, said box beam member being supported near its ends on pedestal frame members; transverse members dividing a plurality of said bins from each other; means to dump material selectively from any or all of said bins; and ground-engaging means supporting said pedestal frame members.

9. The device of claim 8 in which the means to dump materials from said bins is accessible along the bottom of said box beam and the actuating means therefor is mounted in said pedestal frame members.

References Cited in the file of this patent

UNITED STATES PATENTS

| | | |
|---|---|---|
| 1,889,562 | Mouthrop | Nov. 29, 1932 |
| 2,271,434 | Johnson | Jan. 27, 1942 |
| 2,310,592 | Noble | Feb. 9, 1943 |
| 2,340,628 | Theriault | Feb. 1, 1944 |
| 2,493,898 | Pollitz | Jan. 10, 1950 |
| 2,614,708 | Hoffstetter | Oct. 21, 1952 |
| 2,687,285 | Fisher | Aug. 24, 1954 |

FOREIGN PATENTS

| | | |
|---|---|---|
| 815,162 | Germany | Nov. 29, 1951 |

UNITED STATES PATENT OFFICE
CERTIFICATE OF CORRECTION

Patent No. 2,873,036                                       February 10, 1959

Jack D. Noble

It is hereby certified that error appears in the printed specification of the above numbered patent requiring correction and that the said Letters Patent should read as corrected below.

Column 2, line 21, for "drawing" read -- drawings --; column 4, line 70, for "valves" read -- walls --.

Signed and sealed this 16th day of June 1959.

(SEAL)
Attest:

KARL H. AXLINE
Attesting Officer

ROBERT C. WATSON
Commissioner of Patents